(12) United States Patent
van Kirk

(10) Patent No.: US 9,185,228 B1
(45) Date of Patent: Nov. 10, 2015

(54) BUFFERING VOICE DATA IN NETWORK-BASED INSTANT CONNECT COMMUNICATION

(75) Inventor: Douglas R. van Kirk, Mountain View, CA (US)

(73) Assignee: Smith Micro Software, Inc., Aliso Viejo, CA (US)

(*) Notice: Subject to any disclaimer, the term of this patent is extended or adjusted under 35 U.S.C. 154(b) by 2360 days.

(21) Appl. No.: 10/672,579

(22) Filed: Sep. 25, 2003

(51) Int. Cl.
H04M 1/64 (2006.01)
H04M 3/537 (2006.01)
H04M 3/42 (2006.01)

(52) U.S. Cl.
CPC .......... *H04M 3/537* (2013.01); *H04M 3/42042* (2013.01)

(58) Field of Classification Search
CPC .......................... H04M 3/537; H04M 3/42042
USPC ................. 379/88.11, 88.12, 216.01, 217.01, 379/88.13, 908; 455/426.1, 465
See application file for complete search history.

(56) References Cited

U.S. PATENT DOCUMENTS

| | | |
|---|---|---|
| 5,699,481 A | 12/1997 | Shlomot et al. |
| 5,781,613 A | 7/1998 | Knuth et al. |
| 5,842,123 A | 11/1998 | Hamamoto et al. |
| 5,867,793 A | 2/1999 | Davis |
| 5,918,002 A | 6/1999 | Klemets et al. |
| 5,995,824 A | 11/1999 | Whitfield |
| 6,031,818 A | 2/2000 | Lo et al. |
| 6,137,864 A | 10/2000 | Yaker |
| 6,192,259 B1 | 2/2001 | Hayashi |
| 6,222,909 B1 | 4/2001 | Qua et al. |
| 6,363,258 B1 | 3/2002 | Schmidt et al. |
| 6,366,771 B1 * | 4/2002 | Angle et al. ............. 455/414.1 |
| 6,370,375 B1 | 4/2002 | Shively |
| 6,404,773 B1 | 6/2002 | Williams et al. |
| 6,484,027 B1 | 11/2002 | Mauney et al. |
| 6,496,520 B1 | 12/2002 | Acosta |
| 6,574,418 B1 | 6/2003 | Akiba et al. |
| 6,631,409 B1 | 10/2003 | Kowalski et al. |
| 6,665,283 B2 | 12/2003 | Harris et al. |
| 6,671,353 B1 | 12/2003 | Goh |
| 6,751,747 B2 | 6/2004 | Li |
| 6,754,224 B1 | 6/2004 | Murphy |
| 6,810,409 B1 | 10/2004 | Fry et al. |
| 6,826,154 B2 | 11/2004 | Subbiah et al. |

(Continued)

OTHER PUBLICATIONS

U.S. Appl. No. 10/789,581, filed Feb. 26, 2004, Konstantin Othmer.
U.S. Appl. No. 11/781,806, filed Jul. 23, 2007, Konstantin Othmer.
U.S. Appl. No. 11/781,810, filed Jul. 23, 2007, Konstantin Othmer.
U.S. Appl. No. 10/672,579, Oct. 27, 2009, Panel Decision from Pre Appeal Brief.

(Continued)

*Primary Examiner* — Md S Elahee
(74) *Attorney, Agent, or Firm* — Workman Nydegger

(57) ABSTRACT

Systems and methods for managing voice data in network-based instant connect communications. In an instant connect call, instead of immediately playing voice data when it is received, the voice data is buffered on the recipient's device and the recipient is notified of the incoming voice data. The recipient may then play the voice data at a later time before the instant connect call session times out. The recipient may also take the floor and delete the buffered voice data, reject the voice data, or ignore the voice data until the session times out and the buffered voice data is deleted. The recipient can also prevent voice data from being delivered by selecting an answer mode of operation of the recipient's device that enables the recipient to approve senders before voice data is transmitted.

17 Claims, 3 Drawing Sheets

(56) References Cited

U.S. PATENT DOCUMENTS

| | | | |
|---|---|---|---|
| 6,831,912 | B1 | 12/2004 | Sherman |
| 6,885,987 | B2 | 4/2005 | Buchholz et al. |
| 6,930,994 | B1 | 8/2005 | Stubbs |
| 6,952,733 | B1 | 10/2005 | Felsman et al. |
| 6,959,075 | B2 | 10/2005 | Cutaia et al. |
| 7,024,156 | B2 | 4/2006 | Kawamata et al. |
| 7,043,266 | B2 | 5/2006 | Chaturvedi et al. |
| 7,054,420 | B2 | 5/2006 | Barker et al. |
| 7,277,423 | B1 | 10/2007 | Welch |
| 7,277,720 | B2 | 10/2007 | Lazaridis |
| 7,334,132 | B1 | 2/2008 | Kumar et al. |
| 7,336,678 | B2 | 2/2008 | Vinnakota et al. |
| 7,409,456 | B2 | 8/2008 | Sitaraman |
| 7,809,388 | B1 | 10/2010 | Othmer |
| 7,881,326 | B2 | 2/2011 | Siminoff |
| 2002/0080925 | A1 | 6/2002 | Tokunaga |
| 2002/0176546 | A1 | 11/2002 | Dietz et al. |
| 2003/0153343 | A1 | 8/2003 | Crockett et al. |
| 2003/0154243 | A1 | 8/2003 | Crockett et al. |
| 2003/0165135 | A1 | 9/2003 | Itzkovitz et al. |
| 2003/0235184 | A1 | 12/2003 | Dorenbosch et al. |
| 2004/0224678 | A1* | 11/2004 | Dahod et al. ............... 455/426.1 |
| 2004/0248594 | A1* | 12/2004 | Wren, III .................... 455/465 |
| 2005/0164681 | A1 | 7/2005 | Jenkins et al. |
| 2008/0026701 | A1 | 1/2008 | Lazaridis |

OTHER PUBLICATIONS

U.S. Appl. No. 10/789,581, Mar. 1, 2010, Office Action.
U.S. Appl. No. 11/781,810, Apr. 1, 2010, Office Action.
U.S. Appl. No. 10/789,581, Jul. 27, 2010, Notice of Allowance.
U.S. Appl. No. 11/781,806, Jul. 8, 2011, Office Action.
U.S. Appl. No. 11/781,806, Nov. 15, 2011, Final Office Action.
U.S. Appl. No. 11/781,806, Jan. 20, 2012, Notice of Allowance.
U.S. Appl. No. 12/880,603, Apr. 19, 2012, Office Action.
U.S. Appl. No. 12/880,603, filed Sep. 13, 2010, Konstantin Othmer.
U.S. Appl. No. 12/880,603, Nov. 28, 2012, Notice of Allowance
U.S. Appl. No. 13/457,914, Feb. 11, 2014, Office Action.
U.S. Appl. No. 13/457,914, Jul. 21, 2014, Notice of Allowance.
U.S. Appl. No. 13/457,914, filed Apr. 27, 2012, Konstantin Othmer.
U.S. Appl. No. 10/789,581, May 30, 2006, Office Action.
U.S. Appl. No. 10/789,581, Mar. 6, 2007, Office Action.
U.S. Appl. No. 10/789,581, Jun. 13, 2007, Final Office Action.
U.S. Appl. No. 10/789,581, Dec. 31, 2007, Office Action.
U.S. Appl. No. 10/672,579, Apr. 8, 2008, Office Action.
U.S. Appl. No. 10/789,581, Aug. 28, 2008, Office Action.
U.S. Appl. No. 10/672,579, Nov. 28, 2008, Restriction Requirement.
U.S. Appl. No. 10/672,579, Apr. 2, 2009, Final Office Action.
U.S. Appl. No. 10/789,581, Jun. 2, 2009, Final Office Action.
U.S. Appl. No. 10/789,581, Aug. 18, 2009, Advisory Action.
U.S. Appl. No. 10/789,581, Oct. 13, 2009, Notice of Allowance.

* cited by examiner

BUFFERING VOICE DATA IN NETWORK-BASED INSTANT CONNECT COMMUNICATION

BACKGROUND OF THE INVENTION

1. The Field of the Invention

The invention relates to network-based instant connect telecommunication. More particularly, the invention relates to managing incoming voice data by allowing the recipient to apply various answer modes in network-based instant connect communications.

2. The Relevant Technology

Mobile telephones are some of the most common communication devices in use today. As the popularity of mobile telephones and other telephony-enabled wireless devices such as personal digital assistants increases, the ways in which these devices are used also grows. One application of mobile telephone technology is to use mobile telephones as if they were two-way radio devices or "walkie-talkies." The ability to use mobile telephones as walkie-talkies is often referred to as "push-to-talk". Communication in a push-to-talk system can be one-to-one or one-to-many. One example of a push-to-talk system is Nextel's iDEN-based Push to Talk® (also known as Direct Connect™) service.

Push-to-talk systems are typically implemented using standard voice-over Internet protocol (VoIP) technologies or other telephony technologies, where voice data is sent in digital form over data networks. Such push-to-talk systems are hereinafter referred to as "network-based instant connect systems", and they can be deployed in various networks, including wireless and wireline networks.

Network-based instant connect communication allows a sender to speak to a recipient without the customary procedure of dialing a telephone number and waiting for the recipient to answer. Network-based instant connect communication services combine the convenience of near-instantaneous connection between users with the range and security afforded by a network. Once an instant connect session is established over the network, the voice data transmitted from a sender is played on the recipient's device without any action on the part of the recipient. This is in contrast to a regular telephone call where the recipient is required to manually respond to a ringing telephone.

Because network-based instant connect calls are designed to mimic walkie-talkie communication, the communication channel is used in a half-duplex manner, meaning that voice data can only flow in one direction at a time. The ability to transmit voice data is often referred to as "having the floor". In a network-based instant connect communication, the sender typically sends a floor request signal to a server in the network by pressing the talk button on a suitably enabled wireless device. Once the floor is granted, the sender may speak to the recipient until the talk button is released. The recipient of the voice data who does not have the floor can merely receive the voice data and cannot take the floor until the sender relinquishes the floor.

As noted above, one general feature of network-based instant connect communications is that, if the recipient's device is powered on and is in a mode to accept incoming calls, any incoming network-based instant connect calls result in the recipient's device automatically outputting voice data. While this can be desirable in some situations, there may be times when the recipient does not want to immediately hear incoming voice data or to otherwise be interrupted by an instant connect call. For example, while the recipient may not want to risk missing an important communication by powering off the device, at the same time the recipient may not want others to hear the incoming voice data from an instant connect communication or may be in a situation where the unexpected activation of the recipient's device in response to an incoming instant connect communication would be considered an interruption. Thus, automatically outputting the voice data associated with instant connect communications may sometimes be inconvenient or undesirable.

SUMMARY OF THE INVENTION

These and other limitations of conventional network-based instant connect calls are overcome by the invention, which is directed to managing voice data in network-based instant connect communications. The methods of the invention can be applied to network-based instant connect calls that are initiated in conventional ways. In one embodiment, an incoming network-based instant connect call is managed by storing the incoming voice data in a buffer on the recipient's device instead of playing the voice data as it is received in the conventional manner. In this embodiment the voice data from the instant connect call can then be played at a time and in a manner chosen by the recipient upon providing the appropriate input to the recipient's device.

More generally, telecommunications devices, such as mobile telephones, are enabled according to the invention to respond to incoming instant connect calls using a variety of modes that include, for example, a talk mode, a buffer mode, and an approval mode. The talk mode corresponds to the conventional situation where voice data is immediately played on the recipient's device without any action on the part of the recipient of the instant connect call.

In the buffer mode, the recipient's device buffers the voice data from one or more senders and the recipient's device sounds a short beep or other audio signal, vibrates or visually displays information to indicate that voice data has been received on the device. Additional transmissions from the sender are appended to the voice data already in the buffer. If there is more then one sender, all voice data from all senders is buffered until the recipient listens to the voice data or presses the talk button. The recipient is also presented with various options that may be taken in response to the incoming call. One of the options permits the recipient to play the buffered data. The recipient may then choose to respond to the sender(s) by depressing the talk button or otherwise generating a floor request signal. Alternatively, the recipient can request the floor in response to the notification that voice data has been buffered, without having listened to the buffered voice data. In this option, the buffered voice data is typically deleted. In yet another option, the recipient can reject the voice data and the sender is informed that the recipient is not available. Finally, the recipient can simply ignore the voice data. In this case, the buffered audio may be deleted after a specified period of time configured by the recipient or the network administrator, or it may be stored on the device for future playback.

In the approval mode, the recipient must approve the instant connect communication session before the sender's voice data can be transmitted to the recipient. In one embodiment of the approval mode, the sender initiates the instant connect communication in the conventional manner, but the sender's voice data is buffered on a server in the network until the sender is approved by the recipient. In another embodiment, the sender's wireless device is enabled with information about the recipient, which is referred to as "presence" information. Presence information may include availability information, communication mode preferences, geographical location, and other information. Utilizing the features of the present invention, the presence information transmitted to the sender's device may include a visual indicator that the recipient is currently in approval mode. If the sender attempts to initiate an instant connect call to a recipient in approval mode, the sender's wireless device will notify the sender with an audible or visual alert that establishing the communication session requires approval by the recipient. In either case, when the sender initiates an instant connect call, the recipient is provided with information about the sender and prompted to act.

The recipient can explicitly accept the call by pressing one or more keys on the wireless device or otherwise indicating acceptance to the device, in which case the floor becomes available for either party to request. Alternatively, the recipient can accept the call by simply pressing the talk button to request the floor and begin speaking. Finally, the recipient can reject the instant connect communication; if initial voice data has been sent to the recipient and buffered at a server in the network, it is rejected and deleted from the buffer. The sender may then be informed that the recipient is not available.

Recipients of instant connect calls are thereby enabled to manage incoming voice data associated with instant connect calls in different ways. The recipient can select and use different answering modes according to the recipient's situations and preferences. There may be times, for instance, when the recipient desires to immediately hear the voice data. There may be other times when the recipient desires to buffer the voice data, which enables recipients to engage in network-based instant connect telephone communication without the inconvenience or interruption that might otherwise be experienced when the recipient's device automatically activates and outputs voice data in response to incoming calls.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the invention will become more fully apparent from the following description and appended claims, or may be learned by the practice of the invention as set forth hereinafter.

BRIEF DESCRIPTION OF THE DRAWINGS

In order that the manner in which the advantages and features of the invention are obtained, a particular description of the invention will be rendered by reference to specific embodiments thereof which are illustrated in the appended drawings. Understanding that these drawings depict only typical embodiments of the invention and are not, therefore intended to be considered limiting of its scope, the invention will be described and explained with additional specificity and detail through the use of the accompanying drawings in which.

DETAILED DESCRIPTION OF THE PREFERRED EMBODIMENTS

Network-based instant connect communication enables users to communicate using wireless or wireline networks in ways that mimic and exhibit many of the advantageous features of walkie-talkie communication. To place an instant connect call, a sender typically identifies a recipient on the contact list resident on a wireless device and pushes a talk button or otherwise causes the wireless device to initiate an instant connect call to the recipient. As noted previously, conventional instant connect calls are conducted in such a way that once the session is established, the recipient's device decodes and reproduces the sender's voice data as it is received. The invention relates to systems and methods for managing incoming voice data on the recipient's wireless device by buffering the voice data and playing the voice data according to the recipient's preferences instead of immediately playing the voice data at a time that may be inappropriate or disruptive for the recipient. Embodiments of the invention also enable a recipient to approve a sender before voice data may be delivered to the recipient or reject the sender's attempt at instant connect communication.

1. Instant Connect Communication Networks

Figure 1:
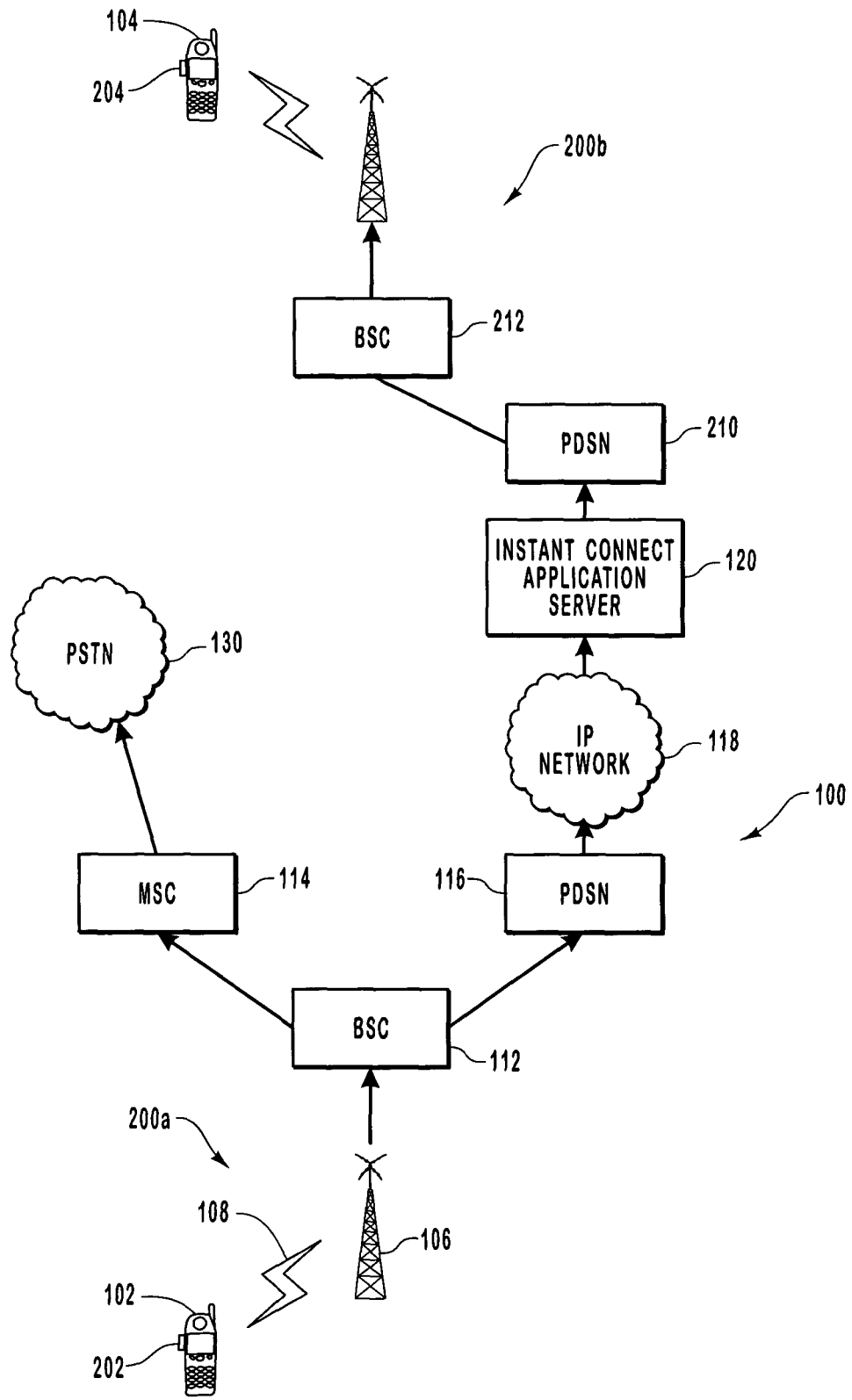
FIG. 1 is a block diagram illustrating a wireless network in which the network-based instant connect communication systems of the invention may be practiced.

In order to describe the various methods of the invention, FIG. 1 illustrates an example of network 100 in which the invention can be practiced. It is to be understood that the network of FIG. 1 represents only an example of the suitable environments in which the invention can be implemented, and that other network architectures, including wireline networks or combinations of wireless and wireline networks, are possible. Network 100 includes one or more wireless telephone networks that operate with network-based instant connect devices 102 and 104. In the illustrated example, device 102 operates within cellular network 200a, while device 104 operates within cellular network 200b.

FIG. 1 illustrates base station 106 in cellular network 200a that communicates with network-based instant connect device 102 by transmitting and receiving radio signals 108. Base stations 106 and other base stations in network 200a operate over respective regions or cells within which the radio signals 108 are sufficiently strong to provide reliable communication. In cellular networks, a grid of partially overlapping cells is positioned in a geographic area to provide service for the network-based instant connect devices anywhere in the range of the cells. Base station 106 may operate under the control of associated base station controllers 112, which may in turn be coupled with a packet data serving node (PDSN) 116. Base station 106 may also be coupled with a mobile switching center 114, which enables device 102 to communicate with the public switched telephone network (PSTN) 130.

In network 100 of FIG. 1, network-based instant connect device 102 may acquire radio connectivity and IP network connectivity in a manner well known in the art. For example, device 102 may issue an origination request to mobile switching center 114, which may send the request back to BSC 112. BSC 112 may assign a traffic channel to device 102, or it might forward the request to PDSN 116, which works with device 102 to establish a data link by which voice and data is transmitted to and received from the device. Device 102 may then initiate and participate in network-based instant connect communication sessions with the assistance of a PDSN 116, which provides device 102 with a gateway to IP network 118. The voice data from device 102 is then delivered to a network-based instant connect application server 120, which among other functionality, may be responsible for arbitrating and managing floor control allocation or voice data transmission.

Alternatively, rather than floor control being arbitrated by a network element such as an instant connect application server, the logic to implement floor control allocation may be resident on the network-based instant connect device, in which case the participating devices decide who controls the floor. In FIG. 1, since the other network-based instant connect device 104 is located within the range of a cellular network 200b, the base station controller 212 and associated PDSN 210 are used to establish the communication between the devices 102 and 104. Network-based instant connect device 104 acquires radio connectivity and IP network connectivity with the assistance of the associated BSC 212 and PDSN 210 as described previously. In this way, the network-based instant connect devices 102 and 104 can communicate with substantially any other compatible network-based instant connect devices that are located in the interoperating cellular networks, such as networks 200a, 200b, etc.

It should be understood that this and other arrangements and processes described herein are set forth for purposes of example only, and other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location, and by software, firmware and/or hardware.

Network-based instant connect calls in network 100 are designed to give the calling parties an experience similar to those that are associated with the use of a conventional or personal walkie-talkie. Network-based instant connect devices 102 and 104 have "talk buttons" 202 and 204, respectively. The talk buttons are used to initiate the transmission of voice data from the corresponding network-based instant connect devices. In general, network-based instant connect calls are initiated when the user selects a recipient from the contact list on a wireless device and presses the talk button. Conventional network-based instant connect calls are received as the receiving device is automatically activated and caused to decode and reproduce the incoming voice data without requiring the recipient to expressly accept the call by manually responding to a ring or other indicator of an incoming call.

Although the cellular networks 200a and 200b on which network-based instant connect calls are carried inherently have full-duplex capabilities, network-based instant connect calls are transmitted using half-duplex communication so as to mimic the walkie-talkie experience. The use of half-duplex communication means that data can travel in only one direction at any given time. In order to indicate to the system in which direction voice data should be sent, network-based instant connect devices 102 and 104 may utilize a talk button or other user input mechanism which causes a floor request signal to be generated. The device that has the floor has the ability to transmit voice data, whereas the device that does not have the floor can only receive the data. The invention, however, can be practiced in conjunction with methods that enable the party without the floor to reassign the floor and initiate the transmission of voice data without waiting for the remote party to relinquish the floor. These methods can be performed in existing cellular networks (e.g., networks 200a and 200b) that have network-based instant connect capabilities as well as with existing network-based instant connect devices that have been adapted to perform the acts disclosed herein. Examples of such methods are disclosed in U.S. patent application Ser. No. 10/652,867, filed Aug. 29, 2003, entitled "Floor Control Management in Network-Based Instant Connect Communication," now U.S. Pat. No. 7,069,032, which is incorporated herein by reference.

2. Buffering of Voice Data Associated with Network-Based Instant Connect Calls

Figure 2:
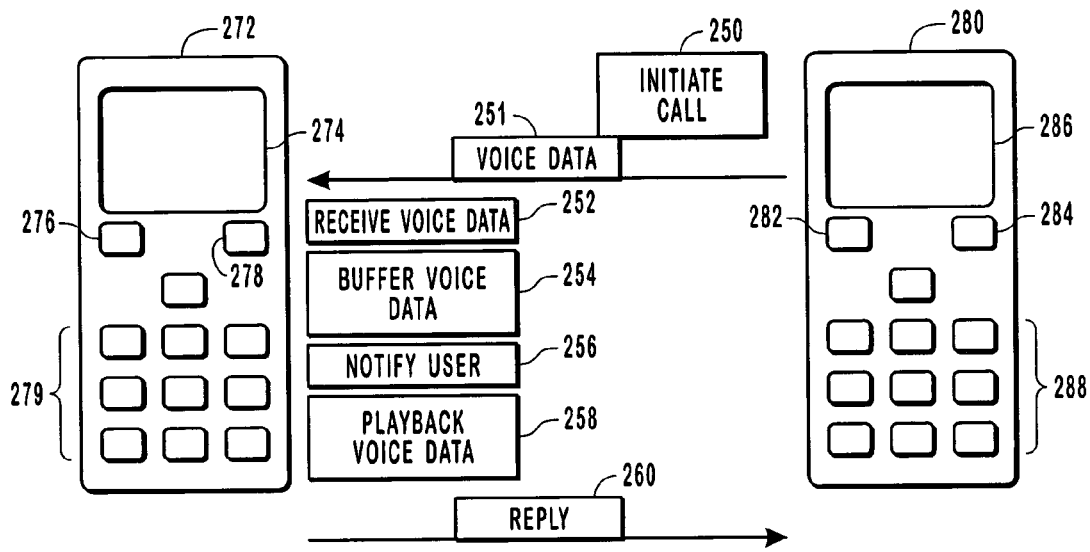
FIG. 2 illustrates one embodiment of a method for buffering voice data at a mobile device.

FIG. 2 illustrates one embodiment of a wireless device that manages voice data in a network-based instant connect telephone call. When an instant connect communication is initiated (act 250) from the device 280, voice data 251 is sent to the device 272 over a network, such as the network illustrated in FIG. 1. In a conventional instant connect communication, device 272 immediately plays the voice data that it receives. As previously described, the recipient of the call may not desire to hear the voice data for any of a number of reasons. In conventional systems, however, the voice data is immediately played unless the device is off, in which case the instant connect communication session is not established.

Embodiments of the invention, however, give the recipient of an instant connect communication the ability to prevent the voice data from being played immediately in the conventional manner. This can be done without losing the voice data and without informing the sender that the recipient is unavailable or offline. In the example of FIG. 2, the voice data 251 transmitted from the device 280 is received (act 252) and buffered (act 254) at the device 272. The voice data is not initially played by the device 272 as it is buffered.

As the voice data is being buffered on the device 272 or after the sender releases the floor, the recipient of the voice data is notified (act 256) visually, audibly or tactilely by the device 272 of the receipt of the instant connect call. The notification can take the form, for example, of a vibration, a short audio signal such as a beep, or a visual notification on the display 274 of the device 272. The display 274 may indicate to the recipient that voice data is waiting or being buffered. Other information, such the identity of the sender, presence information of the sender, and the like, may also be displayed to the recipient on the display 274. The recipient can then playback the voice data (act 258) and reply (act 260) to the sender.

In the device 272, the ability to buffer voice data can be applied differently to different senders, depending on the recipient's preferences. For example, a recipient may desire that voice data be buffered from senders who are not included in the recipient's address book. Alternatively, the recipient may select specific senders whose voice data should be buffered. The option of buffering voice data can also be applied to all senders or to no senders. In general, the invention extends to any methods of selecting or designating the senders whose incoming instant connect voice data is to be buffered instead of being immediately played.

Figure 3:
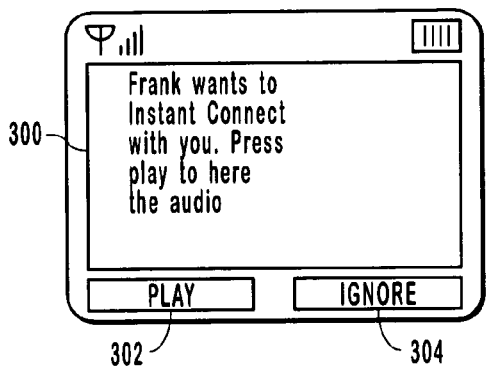
FIG. 3 illustrates one embodiment of a visual notification that may be displayed when voice data is buffered.

FIG. 3 illustrates one example of a visual notification that may be displayed to the recipient of the instant connect communication. Text 300 may be displayed to identify the sender and to provide instructions or options to the recipient regarding the voice data. By selecting play 302, the buffered voice data is played to the recipient. By selecting ignore 304, the notification is dismissed, the buffered voice data is typically erased, and the sender is informed that the recipient is unavailable. The recipient also has the ability to enter into instant connect communication with the sender or to transition to a full duplex wireless telephone call with the sender upon providing the appropriate input to the wireless device.

Figure 4:
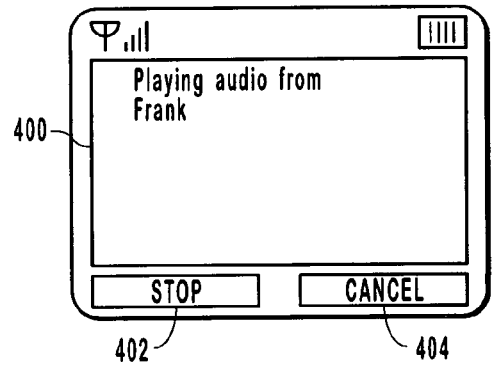
FIG. 4 illustrates one embodiment of a visual notification that may be displayed when the voice data in the buffer is being played back.

FIG. 4 illustrates one example of a visual notification that is displayed when the buffered voice data is being played on the recipient's device. Text 400 may indicate that buffered voice data from the sender is being played. By selecting stop 402, the playback of the voice data is terminated, the notification is dismissed, and the buffered voice data may be erased or saved for playback at a later time.

Other buttons or soft keys on the recipient's device can be used for other functions related to the buffered voice data. A first button or a button tap, for example, may stop the playback of the voice data, dismiss the notification, erase the buffer and establish an instant connect communication session with the sender. A second button or button tap may stop the playback of the voice data, dismiss the notification, erase the voice data from the buffer, and place an ordinary full duplex wireless telephone call to the sender. A third button may save the buffered voice data as a voice message on the device for future playback. In this case the voice data that is converted to a voice message is stored in permanent memory of the device instead of the buffer. In one embodiment, the voice message may be represented in and accessed from a message Inbox on the wireless device.

In many instant connect communications, a call typically occurs in the context of a session. In the absence of the techniques described hereinbelow, if a user's device buffers voice data, there is a possibility that the session will time out prior to the recipient having the opportunity to accept the incoming call. To counteract this potential problem, the user's device can send a keep alive signal during playback or for a specific amount of time to prevent the session from timing out. For example, keep alive signals may be generated while the voice data is being played back. This gives the user enough time to listen to the buffered voice data and initiate a reply to the sender. Keep alive signals may also be generated for a specified amount of time after the voice data has finished playing or finished buffering. Subsequent voice data from the same sender or from other senders can also be appended to the buffered data.

3. Approval of Incoming Voice Data in Network-Based Instant Connect Communication In another embodiment of the invention, the recipient has the ability to select an approval mode wherein the recipient may reject a sender's attempt at instant connect communication. When a sender initiates an instant connect call by selecting a recipient and pressing a talk button, an audible tone or text message informs the recipient of the incoming call that the sender would like to engage in an instant connect call.

According to the invention, if the recipient is in approval mode, the recipient is given the opportunity to either accept or reject the call of the sender. If the recipient accepts the call by pressing an appropriate button, the floor becomes available for either a sender or the recipient to request. The recipient may also approve the sender's attempt at instant connect communication by simply pressing the talk button to request the floor. Once the floor is granted to the recipient, the recipient can begin speaking to the sender. If the sender requests and is granted the floor upon the recipient accepting the call, the recipient may still choose to buffer the voice data as described previously.

If the recipient rejects the call, the sender is notified with an audible tone or text message and the presence information at the sender's device that references the intended recipient may be updated to indicate that the intended recipient is unavailable. The text message may indicate that the recipient is not available to take the instant connect call. If the recipient neither accepts nor rejects the call but does nothing, the session expires and the sender may be prompted to send a voice message instead.

4. Network-Based Instant Connect Call Answer Modes

Figure 5:
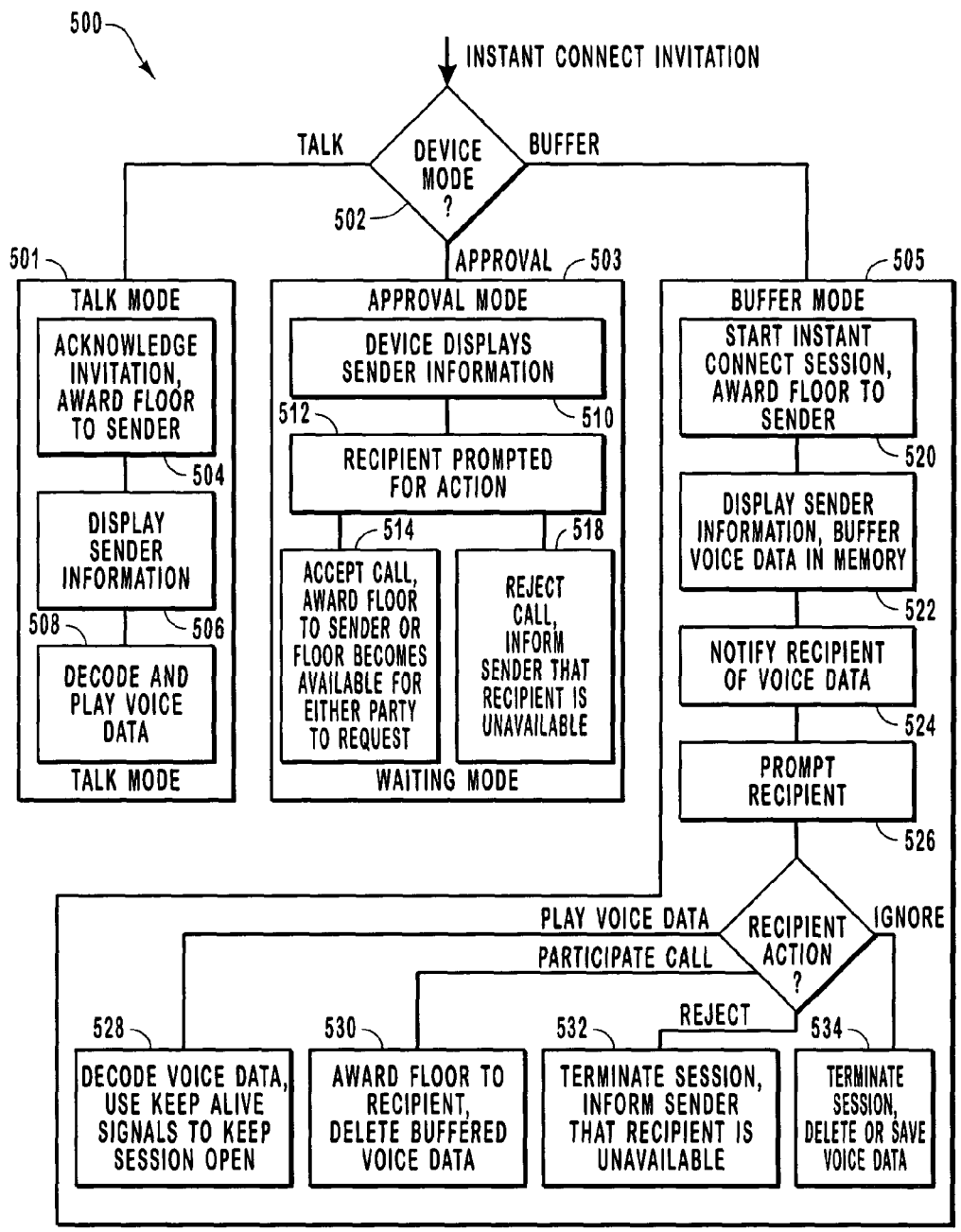
FIG. 5 is a flow diagram illustrating exemplary embodiments of a talk mode, an approval mode, and a buffer mode used to manage voice data in an instant connect telephone call.

FIG. 5 more fully illustrates an example of a method for managing voice data in an instant connect communication system with multiple answering modes. More particularly, FIG. 5 is a flow chart illustrating options available to the recipient's device with regard to voice data in instant connect communications. As previously stated, an instant connect communication typically begins when a sender initiates a session and voice data is sent to the recipient. When the recipient's device receives the invitation from the sender, the actions of the device may depend on an answer mode 502 of the device. The answer mode 502 can change, in one embodiment, based on an identity of the sender. A recipient may designate that the voice data of certain senders should be buffered, while the voice data of other senders should be played immediately without buffering. In this example, the device can select a talk mode 501, an approval mode 503, and a buffer mode 505.

If the device is in the talk mode 501, the device acknowledges the invitation of the sender and the floor is awarded to the sender (act 504). The device may display sender information (act 506) to the recipient. Finally, the data stream received from the sender is decoded and played as audio (act 508) to the recipient. The recipient can continue conversing with the sender during the session. Typically, voice data is not buffered in this mode, which corresponds to a conventional instant connect call.

If the device is in the approval mode 503, the recipient has the option of accepting or rejecting the instant connect communication. The device typically displays sender information to the recipient (act 510) and prompts the recipient of the call to accept or reject the call (act 512). If the recipient accepts the call, the session continues and either a sender or the recipient may then request the floor and begin speaking. Alternately, the floor is automatically given to the sender when the recipient accepts the network-based instant connect call (act 514). In yet another option for implementing this embodiment, the recipient can accept the call by pressing the talk button and requesting the floor. Thus, the floor can be awarded to the recipient, to the sender, or left open. When the floor is left open, either the recipient or the sender can claim the floor. If the recipient rejects the call, the sender is informed that the recipient is not available (act 518) and the voice data is not sent.

If the device is in buffer mode 505, the device acknowledges the invitation and the floor is awarded to the sender (act 520). The device may then display sender information on the display of the device. The device, however, does not decode or immediately play the incoming transmission. The device buffers the voice data in memory (act 522). The recipient is then notified of the stored voice data (act 524) and is prompted to take action (act 526).

The recipient, in this example, can play the audio message or voice data that has been buffered in memory (act 528), participate in the instant connect communication (act 530), reject the call (act 532), or ignore the call (act 534). If the recipient decides to play the voice data that has been buffered in memory, then the voice data is decoded and played on a speaker of the recipient's device or connected with the recipient's device. Keep alive signals are typically generated by the device to keep the session open for a period of time that is sufficient to give the recipient the opportunity to listen to the buffered data and make a decision whether to accept the instant connect call.

If the recipient decides to participate in the instant connect session, the recipient can press the talk button to request the floor. In another embodiment, the recipient can interrupt the sender and take the floor by pressing the talk button and beginning to speak. The buffered voice data is usually deleted from the recipient's device in this instance. If the recipient rejects the call, the session is terminated. The sender may be informed that the recipient is unavailable and the presence information about the recipient may be updated on the sender's device. If the recipient ignores the notification on the device, then the session will likely time out; in this case the buffered voice data can be saved or deleted. In the buffer mode, the fact that the voice data is being buffered is not necessarily known to the sender. The recipient appears available and online when buffering voice data.

Having the ability to select an appropriate answer mode for instant connect communication allows users to better manage the voice data that is received. Selecting the buffer mode enables recipients to engage in instant connect calls while avoiding disruptive or undesirable voice output from the recipient's device. Selecting the approval mode allows recipients to prevent the voice data from reaching their device.

In an instant connect communication, a server may be used to buffer the voice data in a buffer associated with the server. When the server receives a request from a sender to send an instant connect call to a recipient, the server may buffer the voice data in the server's buffer. The server then provides information identifying the sender to the recipient to request the recipient's approval of the instant connect call. If the recipient accepts the instant connect call, then the buffered voice data at the server may be sent to the sender. The voice data may be further buffered at the recipient's device as previously described.

Another advantage of buffering the voice data at the server is that the server may give the sender the option to convert the voice data into a voice message that is delivered to the recipient. This option may occur if, for example, the recipient is unavailable or if the recipient rejects the instant connect call. Alternatively, the sender may be given the ability to delete the voice data from the server's buffer.

After the server stores the voice data in the server's buffer, the server may determine from the recipient that the recipient is unavailable or that the recipient is in approval mode. The server may then generate a presence update that includes an attribute indicating that the recipient is in approval mode. The presence update is then delivered to the sender. One advantage of knowing that the recipient is in an approval mode is that the sender may desire to convert the voice data to a voice message or have the voice data deleted from the server's buffer.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a first mobile telephone configured to use a network to transmit and receive voice data via network-based instant-connect call sessions, a method comprising:
   receiving at the first mobile telephone, via a new network-based instant-connect call session established between the first mobile telephone and a second mobile telephone, voice data from the second mobile telephone, the first mobile telephone including a buffer and a user input device;
   in response to the first mobile telephone receiving the voice data from the second mobile telephone via the new network-based instant-connect call session:
      locally buffering, in the buffer of the first mobile telephone, the voice data received at the first mobile telephone in a buffer mode selected from a plurality of modes, wherein each of the modes is selected based on an identity of a sender;
      instead of automatically beginning to play the locally buffered voice data, prompting a user to provide first user input indicating that the locally buffered voice data should be played, wherein prompting the user to provide the input by displaying an identifier associated with the second mobile telephone that sent the voice data; and
   in response to receiving the first user input via the user input device of the first mobile telephone, playing the locally buffered voice data and sending a signal to prevent first network-based instant-connect call session from timing out while the locally buffered voice data is being played.

2. The method as in claim 1, wherein the user input device of the first mobile telephone comprises a button; and wherein the first mobile telephone plays the locally buffered in response to the button being pressed.

3. The method as in claim 1, wherein the user input device of the first mobile telephone comprises a soft key; and wherein the first mobile telephone plays the locally buffered in response to the soft key being selected.

4. In a first mobile telephone configured to use a network to transmit and receive voice data via network-based instant-connect call sessions, a method comprising:
   receiving at the first mobile telephone, via a first network-based instant-connect call session established between the first mobile telephone and a second mobile telephone, voice data from the second mobile telephone, the first mobile telephone including a buffer and a user input device; and
   in response to the first mobile telephone receiving the voice data from the second mobile telephone via the new network-based instant-connect call session:
      locally buffering, in the buffer of the first mobile telephone, the voice data received at the first mobile telephone in a buffer mode selected from a plurality of modes, wherein each of the modes is selected based on an identity of a sender;
      instead of automatically beginning to play the locally buffered voice data, prompting a user to provide first user input via the user input device of the first mobile telephone, wherein prompting the user to provide the input by displaying an identifier associated with the second mobile telephone that sent the voice data;
   in response to receiving the first user input via the user input device of the first mobile telephone, playing the locally buffered voice data; and
   sending a signal to prevent first network-based instant-connect call session from timing out while the locally buffered voice data is being played.

5. The method as in claim 4, further comprising:
   receiving the first user input via the user input device of the first mobile telephone;
   while playing the locally buffered voice data, receiving second user input; and in response to receiving the second user input:
stopping the playing of the locally buffered voice data; and
deleting the locally buffered voice data.

6. The method as in claim 4, further comprising:
receiving the first user input via the user input device of the first mobile telephone; in response to receiving the first user input via the user input device of the first mobile telephone, playing the locally buffered voice data;
while playing the locally buffered voice data, receiving second user input; and
in response to receiving the second user input:
stopping the playing of the locally buffered voice data;
deleting the locally buffered voice data; and
requesting an initiation of a second network-based instant-connect call session between the first mobile telephone and the second mobile telephone.

7. The method as in claim 4, further comprising:
receiving the first user input via the user input device of the first mobile telephone; in response to receiving the first user input via the user input device of the first mobile telephone, playing the locally buffered voice data;
while playing the locally buffered voice data, receiving second user input; and
in response to receiving the second user input:
stopping the playing of the locally buffered voice data;
deleting the locally buffered voice data; and
requesting an initiation of a full duplex telephone call with the first mobile telephone.

8. The method as in claim 4, further comprising:
receiving the first user input via the user input device of the first mobile telephone; and in response to receiving the first user input via the user input device of the first mobile telephone, deleting the locally buffered voice data without playing the locally buffered voice data.

9. The method as in claim 4, further comprising:
receiving the first user input via the user input device of the first mobile telephone; and in response to receiving the first user input via the user input device of the first mobile telephone, converting the locally buffered voice data into a locally stored voice message that is accessible via a voice message inbox of the first mobile telephone.

10. The method as in claim 4, further comprising:
in response to failing to receive the first user input via the user input device of the first mobile telephone, deleting the locally buffered voice data without playing the locally buffered voice data.

11. The method as in claim 4, further comprising prompting a user of the first mobile telephone to provide the first user input by providing at least one of an audible alert or a tactile alert.

12. The method as in claim 4, further comprising prompting a user of the first mobile telephone to provide the first user input by displaying an identifier associated with the second mobile telephone that sent the voice data via the network-based instant-connect call session; and
in response to receiving the first user input, initiating a full-duplex telephone call with the second mobile telephone.

13. The method as in claim 4, further comprising prompting a user of the first mobile telephone to provide the first user input by displaying a menu including:
a first user-selectable menu option that, when selected, triggers a playing of the locally buffered voice data; and
a second user-selectable menu option that, when selected, triggers a deletion of the locally buffered voice data without playing the locally buffered voice data.

14. The method as in claim 4, further comprising prompting a user of the first mobile telephone to provide the first user input by displaying a menu including a first user-selectable menu option that, when selected, triggers a playing of the locally buffered voice data.

15. A method comprising:
by a communication network configured to transmit voice data via network-based instant-connect call connections:
receiving, from a first mobile telephone, a request to transmit voice data via a new network-based instant-connect call connection with a second mobile telephone;
before granting the request and before granting a floor of the network-based instant-connect call connection to the first mobile telephone to allow the first mobile telephone to commence transmitting voice data via the new network-based instant-connect call connection, establishing the new network-based instant-connect call connection with the second mobile telephone; and
in response to establishing the new network-based instant-connect call connection with the second mobile telephone, automatically granting the request and automatically granting a floor of the network-based instant-connect call connection to the first mobile telephone to cause the first mobile telephone to commence transmitting voice data via the new network-based instant-connect call connection; and
by the second mobile telephone:
receiving, at the second mobile telephone, via the new network-based instant-connect call connection established between the first mobile telephone and the second mobile telephone, the voice data transmitted by the first mobile telephone, the second mobile telephone including a buffer and a user input device; and
in response to the second mobile telephone receiving the voice data transmitted by the first mobile telephone via the new network-based instant-connect call connection:
locally buffering, in the buffer of the second mobile telephone, the voice data received at the second mobile telephone in a buffer mode selected from a plurality of modes, wherein each of the modes is selected based on an identity of a sender;
instead of automatically beginning to play the locally buffered voice data, prompting a user to provide first user input indicating that the locally buffered voice data should be played, wherein prompting the user to provide the input by displaying an identifier associated with the first mobile telephone that sent the voice data; and
in response to receiving the first user input via the user input device of the second mobile telephone, playing the locally buffered voice data and sending a signal to prevent first network-based instant-connect call session from timing out while the locally buffered voice data is being played.

16. The method as in claim 15, wherein the user input device of the second mobile telephone comprises a button; and wherein the second mobile telephone plays the locally buffered voice data in response to the button being pressed.

17. The method as in claim 15, wherein the user input device of the second mobile telephone comprises a soft key;

and wherein the second mobile telephone plays the locally buffered voice data in response to the soft key being selected.

* * * * *